United States Patent [19]

Stuy

[11] 4,063,478
[45] Dec. 20, 1977

[54] SAW ENCLOSURE CONSTRUCTION

[75] Inventor: Hans Stuy, Canastota, N.Y.

[73] Assignee: Diebold Incorporated, Canton, Ohio

[21] Appl. No.: 734,023

[22] Filed: Oct. 20, 1976

[51] Int. Cl.² ............................................. B27B 5/29
[52] U.S. Cl. ..................................... 83/100; 83/168;
            83/477.2; 83/478; 144/252 R
[58] Field of Search .............. 83/100, 168, 169, 477.2,
            83/478; 51/273; 144/252 R

[56] References Cited

U.S. PATENT DOCUMENTS

| 922,840 | 5/1909 | Bemiller | 83/100 |
|---|---|---|---|
| 1,986,726 | 1/1935 | Grozier | 83/100 |
| 2,044,481 | 6/1936 | Manley et al. | 144/252 R |
| 3,007,501 | 11/1961 | Mundell et al. | 144/252 R |
| 3,044,508 | 7/1962 | Sherman | 144/252 R X |

Primary Examiner—Frank T. Yost
Attorney, Agent, or Firm—Frease & Bishop

[57] ABSTRACT

An enclosure or housing for removal of sawdust generated by a saw blade rotating on a shaft located below a work table. A portion of the rotating saw blade projects above the top surface of the work table to engage and saw material being moved on the work table. The saw portion below the work table is located in the chamber formed by the enclosure and the chamber is connected with a source of suction. The enclosure straddles the saw rotor shaft, and its side walls have U-shaped upwardly opening slots through which the rotor shaft extends, located at each side of the saw blade. The slots and one side wall top edge have air seals between the saw blade and said slots and top edge. The saw blade is located parallel with and close to the unsealed enclosure side wall and is spaced a greater distance from the opposite sealed side wall. A top guard having a cover chamber may enclose the portion of the saw blade projecting above the work table. When used, the cover chamber also is connected with the source of suction.

9 Claims, 7 Drawing Figures

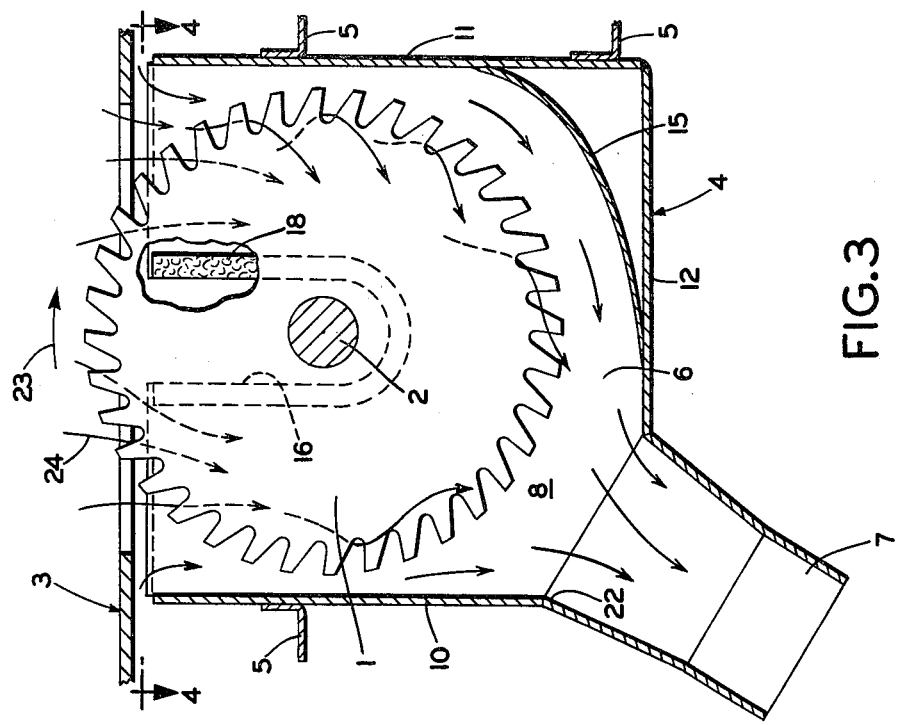
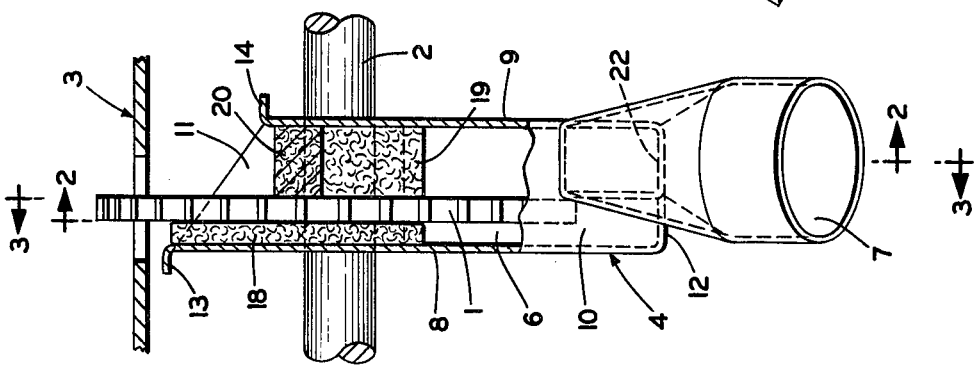
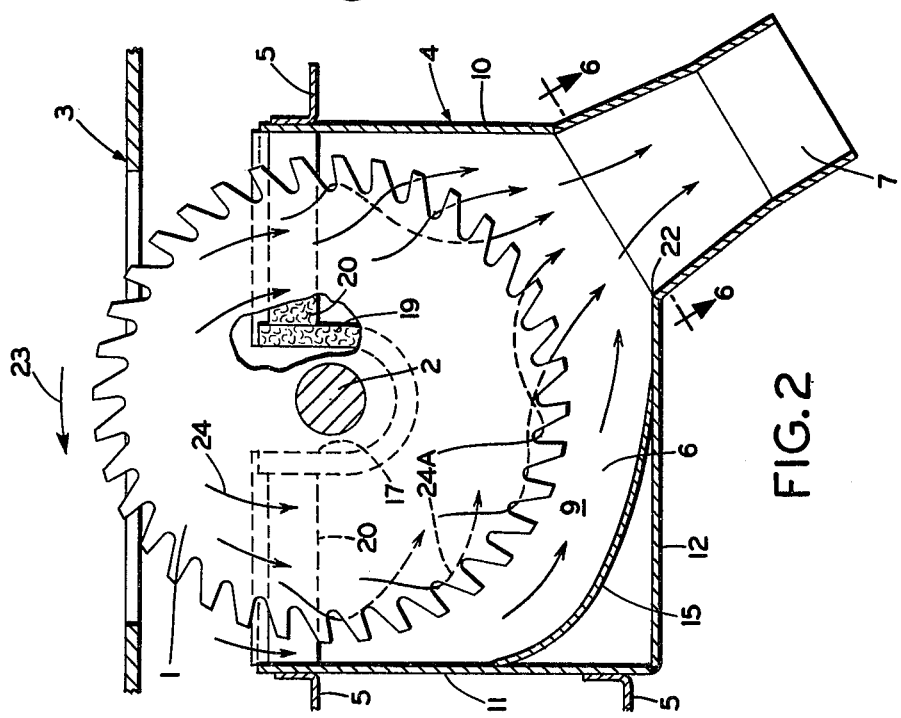
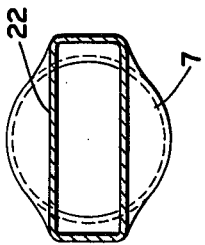

SAW ENCLOSURE CONSTRUCTION

BACKGROUND OF THE INVENTION

1. Field of the Invention

The invention relates to rotary saws and particularly to the type that may be mounted on an axis below a work table with a portion of the saw blade projecting through and above the work table for sawing plywood, asbestos plate, and other materials; and relates more particularly to an enclosure for substantially completely removing sawdust generated by the saw in the most effective way and particularly sawdust particles that heretofore have adhered to the saw teeth.

In addition, the invention relates to an enclosure for the rotary saw which directs high velocity, low volume air currents across the saw teeth during rotation thereof so as to clean sawdust from the teeth.

1. Description of the Prior Art

Previous sawdust removal systems have depended upon suction in saw enclosures to convey dust away from the sawing locale. Efficiency has depended substantially solely upon the natural centrifugal action of the saw blade to throw the sawdust out into the enclosure from which it is conveyed by the suction system connected to the enclosure.

Since the sawdust can escape at any point around the blade, the source of suction connected to the enclosure does not act on or draw the dust in an effective manner away from the saw teeth. At the same time, a large volume of air is used in prior devices to carry away as much of the dust as is possible.

It is especially important in the operation of table saws to remove all sawdust if possible, especially sawdust dangerous to health, such as asbestos board sawdust. The prior sawdust removal systems do not satisfy this important requirement since the prior systems while removing dislodged or free dust do not completely dislodge or remove sawdust entrapped in or adhering to the edges of the teeth or in the valleys between teeth of a saw blade.

This condition apparently exists because centrifugal action of the rotating saw blade and air carried with it are not sufficient in magnitude to dislodge particles of certain kinds or types of material from teeth edges and valleys; and because air currents in prior devices have not had any effective cross blade action at high velocity such as is required to dislodge particles adhering to and entrapped by saw teeth edges.

Accordingly, there exists a need in the field of bench or table saws for an effective and efficient means of removing sawdust, especially sawdust dangerous to health such as asbestos board sawdust, which has not been removed from the saw teeth of rotary saw blades by prior sawdust removal systems.

SUMMARY OF THE INVENTION

Objectives of the invention include providing a new enclosure construction for rotary table saw sawdust removal systems which is cooperatively arranged with respect to the rotating saw blade and the source of suction connected with the chamber provided by the enclosure to create a cross draft of high velocity but low volume air at the saw teeth area of the rotating saw blade; providing such new air current directing enclosure construction cooperatively related to a rotating saw blade which overcomes the tendency of particles of materials to stay entrapped between saw blade teeth because of low terminal particle velocities related to teeth speed; providing such new table saw enclosure construction which is effective to remove by suction established in the enclosure chamber not only the free sawdust particles therein but also those dislodged from the edges of and spaces between saw blade teeth with a much lower volume of air than heretofore used but with an important greater efficiency or percentage of total dust removed; providing such new rotary table saw enclosure construction cooperatively arranged with respect to the rotary saw blade that close to 100% of the sawdust produced by the saw is removed according to test data; providing such new rotary saw enclosure construction in which relatively narrow entrance passages communicating with the enclosure chamber are formed at one side only of the saw blade and on each side of the saw blade rotor shaft, and in which the combined cross-sectional area of said passages approximate that of the enclosure suction exit port, thereby producing a cross flow of air through the saw blade teeth which dislodges particles of material entrapped between adjacent teeth and then entrains the dislodged particles in the airstream drawn by suction from the enclosure chamber; providing such new table saw enclosure construction which may include a top guard having a cover chamber connected with the source of suction to remove chips which may scatter from above the blade during a sawing operation; and providing a construction which is simple in design, efficient in operation, and safe in use, and which satisfies the indicated objectives.

These and other objects and advantages may be obtained by the saw enclosure construction, which, in general terms, may be stated as including a housing forming a chamber adapted to enclose a rotary saw blade mounted on a power driven rotor located below a work table through which an upper portion of the saw blade projects for sawing material supported on the work table; the housing including first and second side walls, end walls, and a bottom wall provided with an open top; that portion of the saw blade beneath the work table being telescoped through the open top into the housing chamber to an offset position in the chamber parallel to the housing side walls so that one saw blade surface is closer to the first side wall than to the second side wall; U-shaped top opening slots formed in the housing side walls straddling the saw blade rotor shaft with the rotor shaft projecting through the slots; the offset orientation of the saw blade in the chamber providing a narrow chamber portion adjacent the first side wall and a wide chamber portion adjacent the second side wall; U-shaped air sealing means extending between the side walls and the saw blade surfaces and along the edges of the U-shaped slots; end sealing means at the top of the wide chamber portion between the second side wall and saw blade and between the U-shaped sealing means and housing end walls; end walls and first side wall and the adjacent surface of the saw blade forming narrow inlet port passage means above the narrow chamber portion; exit port means for the housing chamber located below the wide chamber portion and the end seals; suction means communicating through said exit port means with the housing chamber; the exit port means having substantially the same cross-sectional area as that of the narrow inlet port passage means; thereby directing suction means induced high velocity low volume air flow into the inlet passage, along one surface of the saw blade within the chamber, through the spaces between the saw blade teeth, then into the wide chamber portion, and thence out of the chamber through the exit port means; and preferably top guard cover chamber means connected with the suction means enclosing the saw blade above the work table.

BRIEF DESCRIPTION OF THE DRAWINGS

Preferred embodiments of the invention — illustrative of the best modes in which applicant has contemplated applying the principles — are set forth in the following description, and are shown in the drawings, and are particularly and distinctly pointed out and set forth in the appended claims.

FIG. 1 is an end view of the new enclosure with parts broken away and in section;

FIG. 2 is a cross-sectional view of the left side of the parts shown in FIG. 1, taken on the line 2—2, FIG. 1;

FIG. 3 is a cross-sectional view, looking in the other direction, of the parts shown in FIG. 1 taken on the line 3—3, FIG. 1;

FIG. 6 is a section on line 6—6, FIG. 2; and

Similar numerals refer to similar parts throughout the various figures of the drawings.

DESCRIPTION OF THE PREFERRED EMBODIMENTS

First Embodiment

Figure 4:
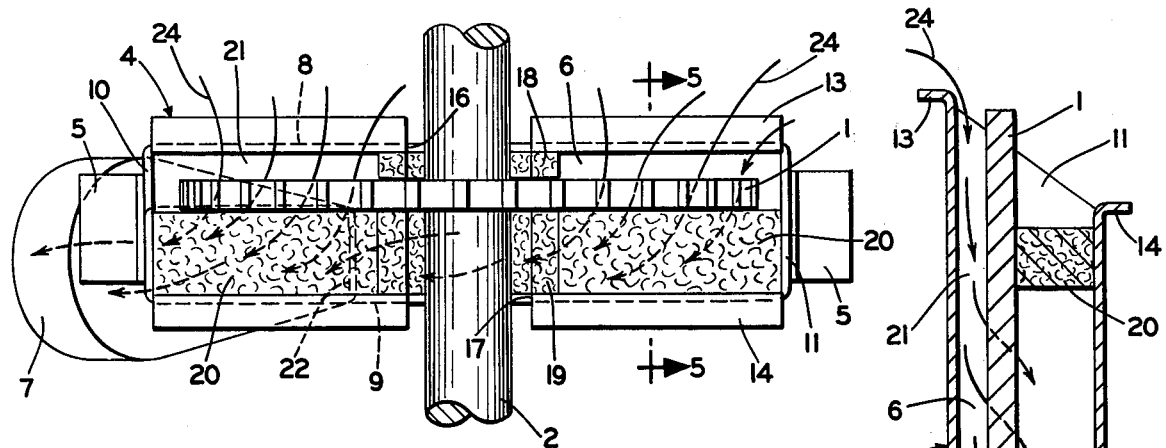
FIG. 4 is a top plan view of the parts shown in FIGS. 1 to 3 looking in the direction of the arrows 4—4, FIG. 3.
Figure 5:
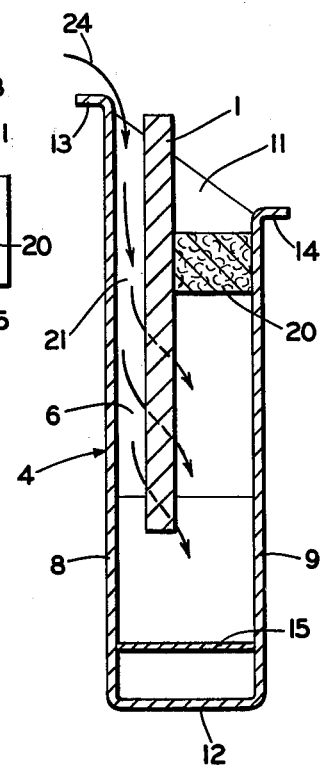
FIG. 5 is a sectional view taken on the line 5—5, FIG. 4.

Fundamental aspects of the invention are shown in FIGS. 1 through 6 of the drawings. A typical table saw blade 1 is mounted on a rotor shaft 2, which is rotated by the usual drive motor, not shown, and the saw and shaft are supported in any usual manner below a work table diagrammatically indicated at 3. The construction and operation of the rotary saw blade and its drive as a bench or table saw form no part of the invention, which concerns a saw enclosure generally indicated at 4 of special construction and coordinated arrangement with respect to the saw blade 1. The enclosure 4 may be removably mounted on the table 3 by support or mounting clips or brackets diagrammatically indicated at 5.

The enclosure 4 may be a housing-like structure of generally rectangular box-shape forming a chamber generally indicated at 6 which is connected with a source of suction through an exit port 7 which may communicate by a flexible hose or other tube or ductwork (not shown) with said source of suction.

The enclosure housing 4 is formed by side walls 8 and 9, end walls 10 and 11, and a bottom wall 12, The side wall 8 is longer or extends a greater distance above the rotor shaft 2 than the shorter side wall 9, as shown in FIG. 1; and the side walls 8 and 9 preferably terminate in outturned upper terminal flanges 13 and 14.

The exit duct 7 preferably is connected to the chamber 6 through a rectangular opening 22 in the region of the corner between end wall 10 and bottom wall 12, as shown in FIGS. 2 and 3. A deflector vane 15 may be mounted within the chamber 6 generally following and spaced from the curved contour of the saw blade portion adjacent thereto.

Each side wall 8 and 9 is formed with a U-shaped upwardly opening slot indicated respectively at 16 in side wall 8 and at 17 in side wall 9. The slots 16 and 17 permit the enclosure 4 to be moved upward to enclose that portion of the saw blade 1 below the work table 3 with the side walls 8 and 9 straddling the saw blade rotor shaft, as shown. Adequate clearance is provided between the rotor shaft 2 and the open U-shaped edges of the slots 16 and 17 to permit movement of the saw blade up and down with respect to the work table 3 in the usual manner to accommodate different thicknesses of material being sawed. The saw enclosure 4 is mounted on that part of the table that carries the saw blade shaft allowing any change of saw blade angle in the usual manner from 90° to 45° or in between to be followed by the saw enclosure.

In accordance with the invention, when the enclosure 4 is mounted in position enclosing the portion of the saw blade 1 located below the work table 3, the saw blade is spaced close to and parallel with the long enclosure side wall 8, and is spaced a much greater distance away from the short enclosure side wall 9, as shown in FIG. 1.

A U-shaped seal 18, preferably formed of a felt-like material, is mounted in the enclosure chamber 6 (FIG. 3) along the edge contour of the U-shaped slot 16 in long side wall 8. The seal 18 is preferably fixed on the interior surface of side wall 8 and extends to and contacts with the adjacent surface of the saw blade 1.

A similar U-shaped seal member 19 is mounted on the interior of short side wall 9 and has a U-shaped contour. Seal 19 is located within the enclosure chamber 6 following the contour of the U-shaped slot 17 and extending between the side wall 9 and the other surface of the saw blade 1, as shown in FIGS. 1 and 2.

The upper end of the enclosure chamber 6 extending between the saw blade 1 and the short side wall 9, at either side of the U-shaped slot 17, is closed by rectangular block-like end seals 20 extending between the upper ends of the U-shaped seal 19 and the end walls 10 and 11, and between the side wall 9 and the adjacent surface of the saw blade 1, as well shown in FIGS. 1 and 4.

The seals 18, 19 and 20 thus seal off the enclosure chamber 6 at the upper end of the enclosure 4 except for the narrow inlet passages 21 (FIGS. 4 and 5) which extend between the upper ends of the U-shaped seal 18 and the enclosure end walls 10 and 11, and between the long side wall 8 and the adjacent surface of the saw blade.

In accordance with the invention, the combined cross-sectional area of the narrow inlet passages 21 preferably is approximately equal to the area of the rectangular opening 22 for the exit port 7 (FIG. 6).

During operation of the saw 1 when rotated by the drive for shaft 2, with the saw blade rotating in the direction of the arrow 23 in FIGS. 2 and 3, and with a condition of suction at the outlet or exit port 7, air is drawn into the enclosure chamber 6 through the narrow inlet passages 21, as indicated by the arrows 24 in FIGS. 2, 3, 4 and 5 and along the narrow space between the long side wall 8 and the left-hand face (FIG. 1) of the saw blade 1 until it reaches the saw teeth area of the rotating saw blade. At this point, high velocity air currents pass through the notches between adjacent saw teeth, as indicated by the dotted portions 24A of the arrows which illustrate the air travel in FIG. 2, to the wider portion of the enclosure chamber 6 located between the saw blade and short side wall 9 and below end seals 20. The air currents then are exhausted through exit port 7.

In this manner, the air moves into the enclosure through the narrow side of the enclosure on each side of the shaft seal 19 through the narrow inlet passages 21. These inlet passages in accordance with the invention are intended and calculated to have an area sufficiently small to keep entering air velocities as high as the air velocities at the exit port 7, since the exit port 7 suction pulls more on the wide side of the chamber 6 than on the narrow side. Air is prevented from directly entering the wide side of the chamber 6 by the U-shaped seal 19 and the end seals 20 so that it can only enter the wide side as swift air currents drawn into the narrow side of the chamber and through the spaces between adjacent saw teeth and the zone surrounding the outside of the rotating saw blade teeth.

This produces a cross flow of the air within the chamber 6 through the saw blade teeth which dislodges, cleans out and removes particles of material that may be entrapped between the saw blade teeth, especially those small particles with small terminal velocities that follow the saw blade induced airstream. In actual use, tests have shown that the sawdust is almost 100% removed from the saw and enclosure.

Second Embodiment

Figure 7:
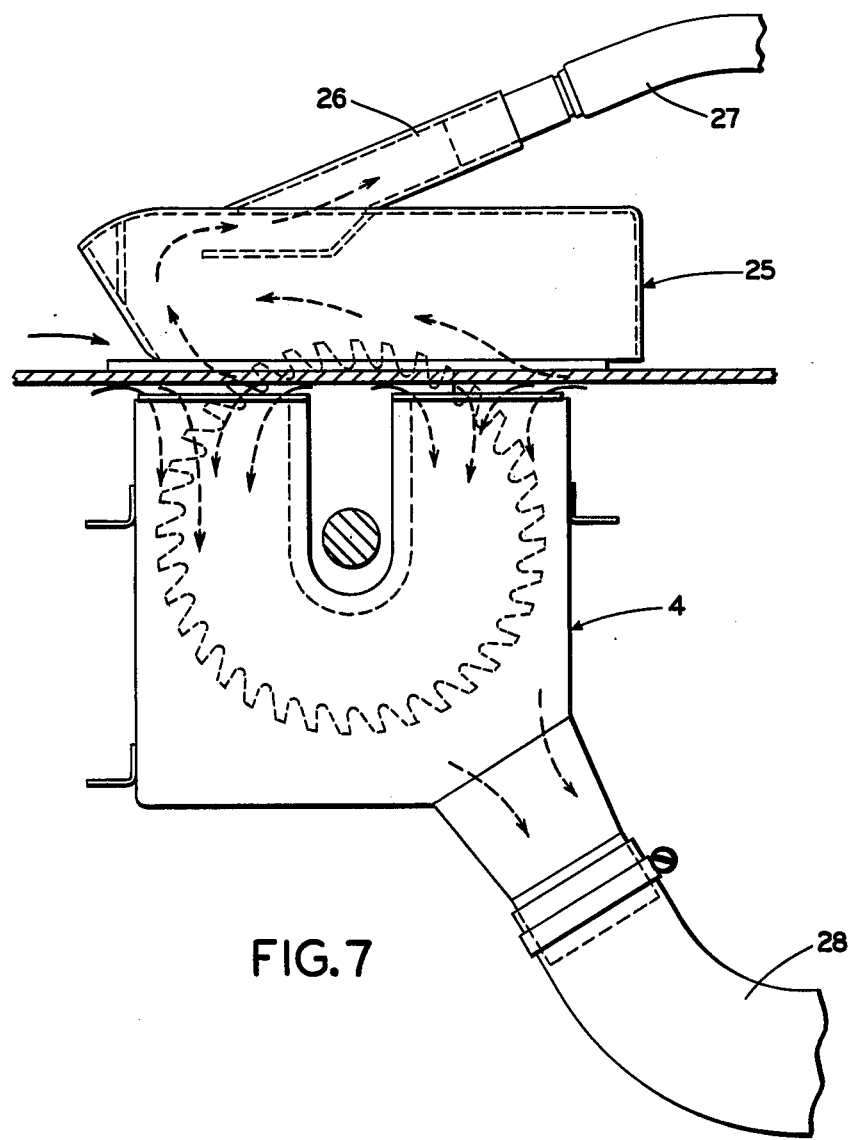
FIG. 7 is a view similar to FIG. 2 showing a modified form of construction.

A further embodiment of the invention is illustrated in FIG. 7. Table saws usually are supplied with a top guard, generally indicated at 25, the main function of which is to guard the operator from injury by accidental contact with the rotating saw blade. Where a correct selection is made of saw blade with respect to the type and thickness of material being sawed, no chips should form or accumulate above the table. However, if there is an incorrect match of saw blade and material, chips can be produced and accumulate above the work piece in the usual top guard.

In the embodiment of the invention shown in FIG. 7, the usual top guard 25 is modified to connect the chamber therein through an exit duct 26 and a hose 27 to the suction source which may be the same suction source to which the hose 28 for the improved saw blade enclosure 4 illustrated in FIG. 7 is connected.

The arrow 29 illustrates the direction in which the work piece 30 is moved when being sawed. When the modified top guard illustrated is used in conjunction with the improved saw enclosure 4, and if chips are formed because of use of an incorrect saw size or style, the chips are exhausted from the top guard chamber through the hose 27, and at the same time, all dust is exhausted through the hose 28 from the new enclosure 4.

In General

The improved saw enclosure incorporating the concepts of the invention provides high velocity air currents which are drawn across the teeth of a rapidly rotating saw blade to clean or remove all particles deposited on or entrapped by the saw teeth from the rotating saw. Thus, the new enclosure construction and arrangement with respect to the saw blade not only facilitates sawdust removal but also provides for a more complete sawdust removal than any known prior sawdust removal system.

Furthermore, because the saw enclosure is sealed except for the small area inlet passage means which establishes the high velocity air currents, only a relatively small volume of air is needed for the efficient sawdust removal, and the effective volume of air used is much lower than heretofore used in the inefficient prior sawdust removal systems.

Accordingly, the new saw enclosure construction of the present invention provides a most efficient sawdust removal system, satisifying the stated objectives, and obtaining the new results indicated.

Finally, the new enclosure construction combined with the modified top guard enables chips, when produced at the top of the work piece to be removed along with complete removal of sawdust.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the equipment is constructed and operated, and the advantageous, new and useful results obtained; the new and useful structures, devices, elements, arrangements, parts, combinations, systems, equipment, operations and relationships are set forth in the appended claims.

I claim:

1. In saw enclosure construction for removing sawdust from the teeth of a rotary table saw; a housing having first and second side walls, end walls and a bottom wall forming an enclosure chamber open at the top adapted to be telescoped over a saw blade carried by a rotor shaft beneath a work table through which the saw blade projects upwardly to saw a work piece supported on the table; the housing when in saw enclosure position having the first side wall located parallel with and close to one saw blade face to form a narrow chamber portion, and having the second side wall located a greater distance from the other saw blade face to form a wide chamber portion; means sealing the wide chamber portion against the direct entry of exterior air thereinto on the wide chamber portion side of the saw blade; suction means connected with the chamber; inlet port means for the chamber connected with the narrow chamber portion at the top of the housing; and air currents induced in the inlet port means by the suction means flowing at high velocity through the narrow chamber portion and through the teeth of a rapidly rotating saw blade to enter the wide chamber portion from which the air currents are exhausted by the suction means.

2. The construction defined in claim 1 in which the open top of the housing above the wide chamber portion is sealed by felt sealing means mounted within the wide chamber portion on the second side wall and contacting the wide chamber face of the saw blade to provide the means sealing the wide chamber portion against the direct entry of exterior air.

3. The construction defined in claim 2 in which U-shaped slots open at the top are formed in the first and second housing side walls through which the rotor shaft extends; and in which felt sealing means extends between the side walls and the faces of the saw blade within the narrow and wide chamber portions along the edges of the U-shaped slots to seal the chamber against entry of exterior air through the U-shaped slots.

4. The construction defined in claim 3 in which exit port means is formed in the housing walls to provide the connection for the suction means with the chamber; and in which the cross-sectional area of the inlet port means is substantially equal to the cross-sectional area of the exit port means.

5. The construction defined in claim 4 in which the exit port means is generally rectangular in shape and is located at a corner between the housing bottom wall and one end wall and beneath the wide chamber portion.

6. The construction defined in claim 1 in which top guard means encloses that portion of the saw blade projecting upward through the work table, and in which the suction means communicates with the interior of the top guard means to remove chips produced above the table during a sawing operation.

7. In a table saw of the type having a saw blade carried by a rotor shaft mounted beneath a work table through which the saw blade projects upwardly to saw a work piece supported on the table; walls forming sawdust removal housing means enclosing that portion of the saw blade beneath the work table; the housing means having first and second side walls; the saw blade portion in the housing being located parallel with the side walls and closer to the first side wall than to the second, thereby forming narrow inlet chamber means on one side and wide exit chamber means on the other side of the saw blade; the housing means being formed with inlet port means adjacent the work table communicating with the inlet chamber means and being formed with exit port means communicating with the exit chamber means; the housing means walls forming the inlet port means being open at the top adjacent the work table; felt sealing means mounted within the wide exit chamber means at the top of the housing walls contacting the exit chamber face of the saw blade to seal the wide exit chamber means against the direct entry of exterior air; suction means connected with the exit port means; and the cross-sectional area of the inlet port means being approximately equal to the cross-sectional area of the exit port means, whereby the suction means induces a flow of high velocity air through the inlet chamber means from the inlet port means and thence across the saw blade teeth to enter the exit chamber means from which the air is exhausted by the suction means through the exit port means.

8. The construction defined in claim 7, in which U-shaped slots open at the top are formed in the first and second side walls through which the rotor shaft extends; and in which felt sealing means extends between the side walls and the faces of the saw blade within the narrow inlet and wide exit chamber means along the edges of the U-shaped slots to seal the inlet and exit chamber means against entry of exterior air through the U-shaped slots.

9. The construction defined in claim 8 in which the exit port means is formed in the housing walls below the wide exit chamber means offset from the saw blade, and in which the exit port means is generally rectangular in shape.

* * * * *